United States Patent [19]
Heyns

[11] Patent Number: 5,683,128
[45] Date of Patent: Nov. 4, 1997

[54] MOTOR VEHICLE FRONT END PROTECTOR

[75] Inventor: Andrew Heyns, Robertville, South Africa

[73] Assignee: Megabar CC, Robertville, South Africa

[21] Appl. No.: 714,367

[22] Filed: Sep. 16, 1996

[51] Int. Cl.$^6$ .................................................. B60R 19/02
[52] U.S. Cl. ........................... 293/115; 293/144; 293/154
[58] Field of Search ............................... 293/115, 142, 293/143, 144, 145, 154, 155, 146, 148, 130

[56] References Cited

U.S. PATENT DOCUMENTS

| | | | |
|---|---|---|---|
| 2,191,751 | 2/1940 | Cataldo | 293/144 X |
| 2,214,514 | 9/1940 | Walklet | 293/144 |
| 2,246,752 | 6/1941 | Paddock | 293/144 |
| 2,250,565 | 7/1941 | Bahr | 293/144 |
| 3,438,667 | 4/1969 | Davis | 293/115 |
| 4,168,855 | 9/1979 | Koch | 293/115 |
| 4,469,360 | 9/1984 | Drury | 293/144 X |
| 4,671,552 | 6/1987 | Anderson et al. | 293/144 |
| 5,067,760 | 11/1991 | Moore et al. | 293/115 |
| 5,215,343 | 6/1993 | Fortune | 293/115 X |
| 5,277,465 | 1/1994 | Weir | 293/142 |

FOREIGN PATENT DOCUMENTS

| | | | |
|---|---|---|---|
| 3518899 | 11/1986 | Germany | 293/115 |
| 2269566 | 2/1994 | United Kingdom | 293/115 |

*Primary Examiner*—Joseph D. Pape
*Attorney, Agent, or Firm*—Christie, Parker & Hale, LLP

[57] ABSTRACT

A motor vehicle front end protector is provided in which a plurality of vertically spaced protective bars are supported by a pair of laterally spaced uprights. In most cases the ends of the protective bars are also interconnected by upright end pieces, preferably of channel or box-shape in cross-section. Additional spacers can be fitted between the uprights to fix their position relative to each other. The protector is characterised in that all connections between protective bars and uprights; protective bars and upright end pieces; and uprights or upright end pieces and spacer bars are effected by releasable fasteners, usually bolts. This enables damaged parts to be replaced individually as and when required in an easy and effective manner without requiring surface treatment of the assembly.

7 Claims, 2 Drawing Sheets

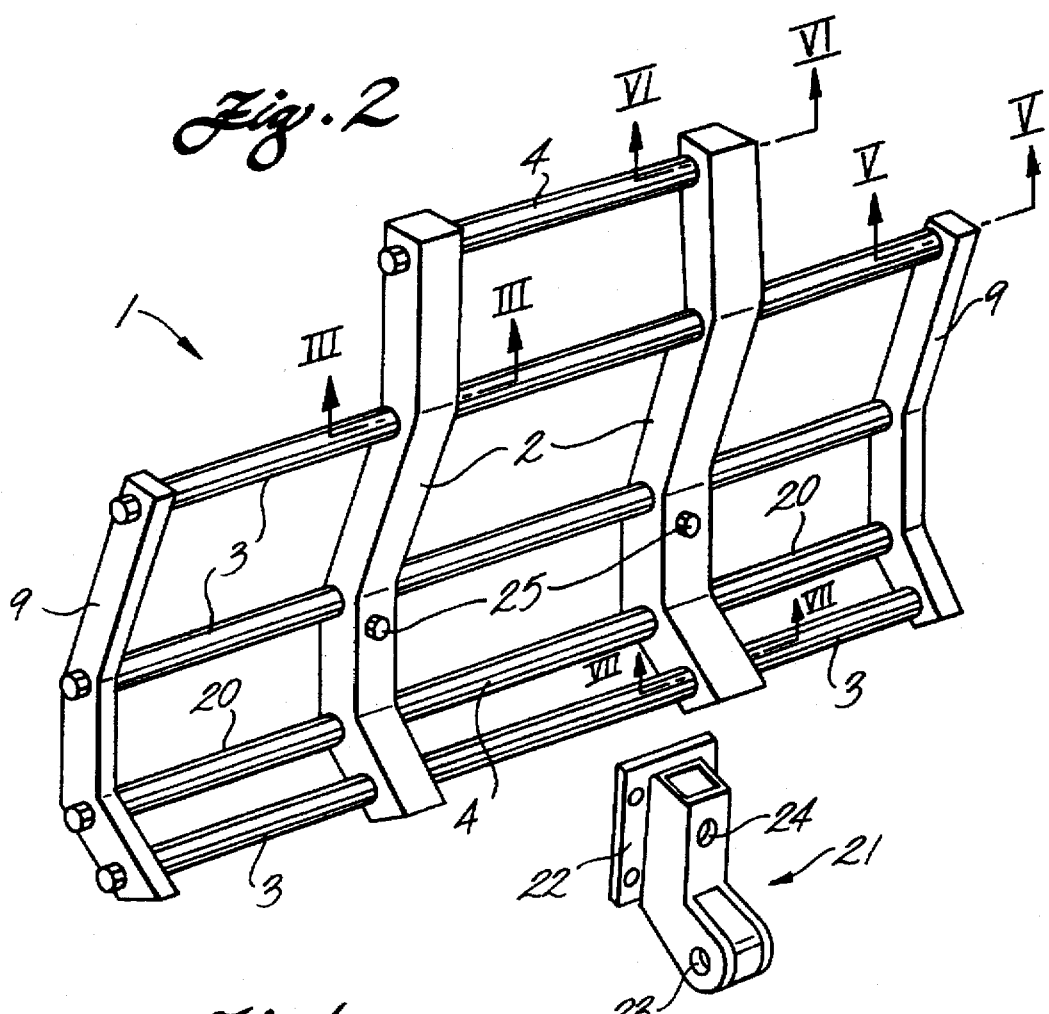
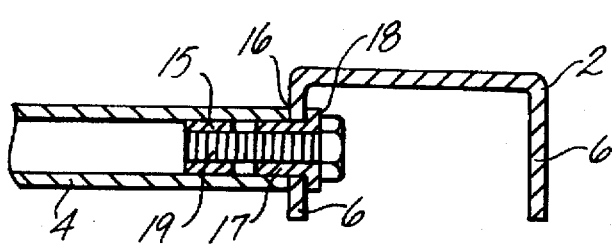

1

MOTOR VEHICLE FRONT END PROTECTOR

FIELD OF THE INVENTION

This invention relates to a motor vehicle front end protector of the type usually comprising a pair of uprights supporting a plurality of protective cross-bars and which is mounted in front of a motor vehicle's engine and radiator in order to protect it from damage in the event that the vehicle strikes certain objects which would otherwise damage it, in particular animals.

Such protectors are known by various names in various different countries, probably the most common being "bull bars".

BACKGROUND TO THE INVENTION

Motor vehicle front end protectors of the general type outlined above are usually made of channel-shaped or box-sectioned uprights to which the protective cross-bars are usually fixed by welding. Upright end pieces may also be welded to the ends of the protective bars in order to mutually support them and the uprights are usually attached to the vehicle bumper or a portion of the chassis in the vicinity of the bumper.

It is not uncommon that a protector of this type becomes damaged in consequence of an impact with, for example, an animal, and will need to be repaired. Repair of a welded assembly is extremely time consuming and costly and, in the event that the protector is chrome plated, requires that the entire protector assembly be replated. This is extremely costly and inconvenient.

It is the object of this invention to provide a motor vehicle front end protector of this general type wherein repair, and in the event that it is applicable, chrome or other plating thereof, may be more easily and efficiently carried out.

SUMMARY OF THE INVENTION

In accordance with this invention there is provided a motor vehicle front end protector comprising at least two laterally spaced uprights supporting at least two vertically spaced transverse protective bars, the protector being characterised in that the uprights and protective bars are releasably secured together by means of releasable fasteners.

Further features of the invention provide for the uprights to be of channel or box-shape in cross-section to thereby define two opposed flanges and wherein the protective bars are each of a one-piece construction and pass through apertures formed in the opposed flanges of the uprights; for each upright to have secured to the inside of its flanges gusset plates located one on each of two diametrically opposed zones of a protective bar at each position where a bar passes through an upright and wherein at least one releasable fastener, conveniently a bolt or stud, secures the protective bars to the gusset plates in each case.

Still further features of the invention provide for the ends of the protective bars to be interconnected by means of upright end pieces releasably secured to the protective bars by means of releasable fasteners such as bolts; and for each of the end pieces to be of channel or box-shape in cross-section to thereby define two opposed flanges and wherein each end of each protective bar extends through one flange and is bolted to the inside of the other flange by means of an axially extending bolt co-operating with a screw-threaded socket in each end of each protective bar.

Additional features of the invention provide for the uprights to be additionally held in relationship relative to each other by means of one or more elongate spacers secured to the upright by means of releasable fasteners; for each upright to have a bracket towards its lower end whereby the upright may be mounted to a motor vehicle chassis or bumper to extend upwardly therefrom; for each upright to be attached to its associated bracket by means of a hinge arrangement having a horizontal axis and wherein the upright is releasably bolted to a zone of the bracket spaced from the hinge in order to hold it in its operative upright position; and for the lowermost protective bar to pass through a journal formation in each bracket to thereby define the hinge and hold the upright captive relative to the bracket.

In order that the above and other features of the invention may be more fully understood, one embodiment thereof will now be described with reference to the accompanying drawings.

BRIEF OF THE DRAWINGS

In the drawings:

FIG. 2 is an isometric view of the protector itself and showing a mounting bracket exploded relative thereto;

FIG. 6 is a detailed cross-section taken along line VI to VI through of FIG. 2 an upright where a spacer is secured thereto.

DETAILED DESCRIPTION WITH REFERENCE TO THE DRAWINGS

Figure 1:
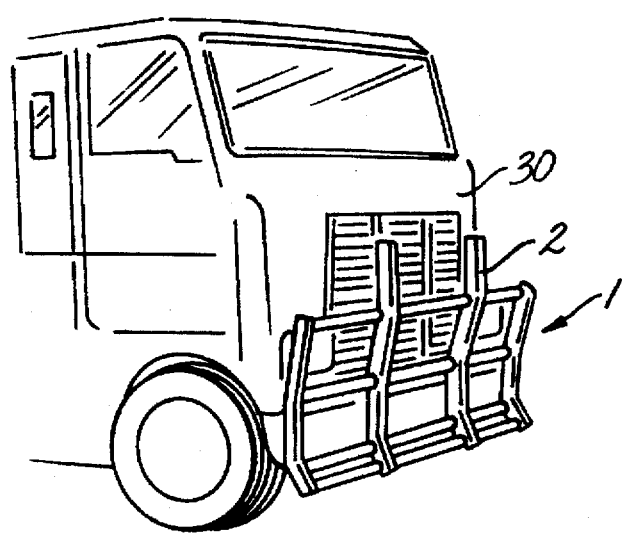
FIG. 1 is a perspective illustration of the front end of a transport vehicle fitted with a front end protector according to the invention.

As illustrated in FIG. 1, the front end protector, generally indicated by numeral (1) is mounted in substantially conventional position in front of the radiator (2) associated with a cab (30) of a heavy duty transport vehicle.

In basic structure the protector comprises two laterally spaced uprights (2) of channel-shape in cross-section through which pass three vertically spaced one-piece protective bars (3) which are conveniently, as is usual in the trade, of a thick walled tubular configuration.

The uprights are also held in fixed spaced relation by elongate spacers (4), one of which is located at their upper ends, and one upwardly of the lowermost protective bar (3).

Figure 3:
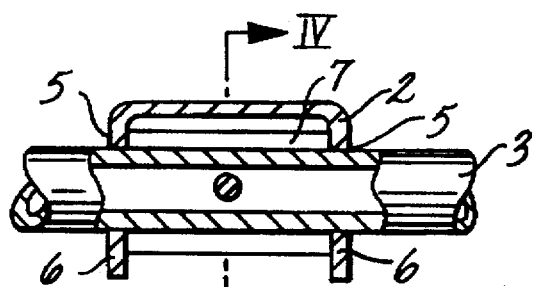
FIG. 3 is a detailed section taken along line III to III in FIG. 2 and FIG. 4, being a cross-section through an upright where a protective bar passes therethrough.
Figure 4:
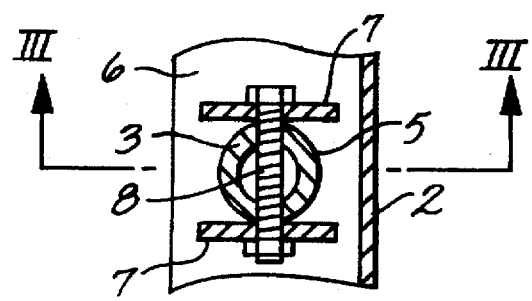
FIG. 4 is a cross-section taken along line IV to IV in FIG. 3 and rotated clockwise 90°.

As provided by this invention, the components are not welded together. Each of the protective bars (3) passes through holes (5) provided in the flanges (6) of the uprights. At each position where a protective bar passes through one of the uprights, a pair of gusset plates (7) are welded to extend between the two flanges (6) such that the gusset plates are located at diametrically opposite positions relative to the zone of the protective bar positioned between the flanges (6) of the upright as shown most clearly in FIGS. 3 and 4. A bolt (8) passing through holes in the gusset plates and holes through the protective bar (3) secure these components relative to each other.

Figure 5:
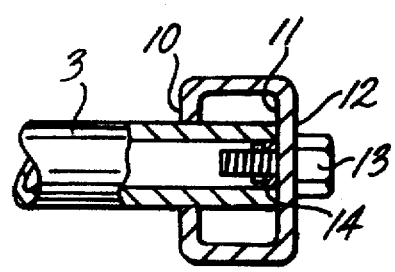
FIG. 5 is a detailed cross-section taken along line V to V through of FIG. 2 an upright end piece where a protective bar is secured thereto.
Figure 7:
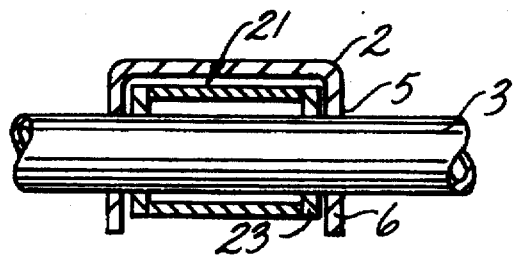
FIG. 7 is a detailed section taken along line VII to VII where the lower most protective bar passes through an upright and through a journal formation associated with a mounting bracket.

The protective bars extend well beyond the outer edges of the uprights to extend substantially across the entire width of the motor vehicle cab and the free ends are interconnected by means of upright end pieces (9) preferably of rectangular cross-sectioned tubular shape. As shown in FIG. 5, in each case the end of a protective bar (3) extends through a hole (10) in one flange and is bolted against the inner surface (11) of the opposite flange (12). Securing is carried out by means of a bolt (13) extending into a nut (14) fixed in the end of the bore of the tubular protective bar.

The ends of each of the spacers (4) are connected to the upright slightly differently and as shown in FIG. 6. In this case a nut (15) is fixed in the tubular spacer (4) inwardly of the free end (16) thereof. A ferrule (17) passes through a hole in the flange (6) of the upright and into the bore of the tubular spacer, the ferrule having a larger diameter head (18) on the inside of the flange (6). A bolt (19) passing axially through the ferrule and into the nut (15) is used to clamp the free end of the spacer firmly against the outer surface of the upright with the head (18) being opposite such free end. This configuration allows additional collinear spacers (20) to be installed between the uprights and the upright end pieces (9) upwardly of the lower most protective bar (3).

In order to mount the protector onto the vehicle, there are provided two brackets, such as that illustrated in FIG. 2. Each bracket (21) has a base plate (22) for securing to a bumper or chassis, or additional brackets supported by a chassis, and a journal (23) is provided on the bracket at a lowermost and outwardly directed position. The journal (23) is adapted to receive the lowermost protective bar passing therethrough within the confines of the channel-shaped upright so that it is substantially totally obscured, other than possibly the base plate. The uprights and therefore the whole protector assembly can be rotated about these journals in order to provide access to the vehicle's engine. A socket (24) is provided in each bracket upwardly of the journal (23) and is arranged such that bolts (25) can be used to secure the uprights to the bracket in an operatively upwardly extending position and can be removed when it is required that the protector assembly be rotated to a downward position.

It will be understood that the components of the assembly described above can be individually fabricated, chrome plated and then assembled. This has the tremendous advantage that any damaged components can be removed and replaced without requiring any treatment of the other components and without requiring any additional surface treatment of any sort whatsoever.

It will be understood that numerous variations may be made to the embodiment of the invention described above without departing from the scope hereof.

What I claim as new and desire to secure by Letters Patent is:

1. A motor vehicle front end protector comprising at least two laterally spaced uprights supporting at least two vertically spaced transverse protective bars, the protector being characterised in that the uprights and protective bars are releasably secured together by means of releasable fasteners, wherein each of the uprights is of channel or box-shape in cross-section thereby defining two opposed flanges and the protective bars are each of a one-piece construction and pass through apertures formed in the opposed flanges of the uprights, and wherein each upright has secured to the inside of its flanges gusset plates located one on each side of two diametrically opposed zones of the protective bars at each position where they pass through the uprights and at least one releasable fastener secures the protective bars to the gusset plates in each case.

2. A protector as claimed in claim 1 in which the releasable fasteners are bolts passing through aligned holes in the gusset plates and protective bars.

3. A motor vehicle front end protector comprising at least two laterally spaced uprights supporting at least two vertically spaced transverse protective bars, the protector being characterised in that the uprights and protective bars are releasably secured together by means of releasable fasteners, wherein the ends of the protective bars are releasably interconnected by means of upright end pieces secured to the protective bars by means of releasable fasteners.

4. A protector as claimed in claim 3 in which the end pieces are of channel or box-shape in cross-section thereby defining two opposite flanges and each end of each protective bar extends through one flange and is bolted to the inside of the other flange by means of an axially extending bolt co-operating with a screw threaded socket in each end of each protective bar.

5. A protector as claimed in claim 3 in which the uprights are additionally held in spaced relationship relative to each other by means of one or more elongate spacers secured to the uprights by means of releasable fasteners.

6. A protector as claimed in claim 5 in which each spacer has a screw threaded socket found in its end which is bolted against the outer surface of the associated upright.

7. A motor vehicle front end protector comprising at least two laterally Spaced uprights supporting at least two vertically spaced transverse protective bars, the protector being characterised in that the uprights and protective bars are releasably secured together by means of releasable fasteners, wherein each upright has a bracket towards its lower end whereby the upright may be mounted to a motor vehicle chassis or bumper to extend upwardly therefrom, wherein each upright is attached to its associated bracket by means of a hinge arrangement having a horizontal axis, and the upright is releasably bolted to a zone of the bracket spaced from the hinge in order to hold it in its operative upright position, and wherein the lowermost protective bar passes through a journal formation on each bracket to thereby define the hinge and hold the upright captive relative to the bracket.

* * * * *